United States Patent
Huggins et al.

(10) Patent No.: US 6,270,332 B1
(45) Date of Patent: Aug. 7, 2001

(54) SYSTEM FOR CONTINUOUS MANUFACTURE OF MOLDED PARTS WITH INSERT PIECES

(75) Inventors: Peter D. Huggins, Ashtabula; Dennis R. Allds, deceased, late of Ashtabula, by Candace J. Allds, executrix; Robert Campbell, Conneaut, all of OH (US)

(73) Assignee: Iten Industries, Cleveland, OH (US)

( * ) Notice: Subject to any disclaimer, the term of this patent is extended or adjusted under 35 U.S.C. 154(b) by 0 days.

(21) Appl. No.: 09/404,455

(22) Filed: Sep. 22, 1999

(51) Int. Cl.[7] .................................................. B29C 45/18
(52) U.S. Cl. ........................................ 425/127; 425/129.1
(58) Field of Search .................................... 425/110, 116, 425/127, 129.1

(56) References Cited

U.S. PATENT DOCUMENTS 4,216,184 * 8/1980 Thomas ................................ 425/127
5,415,536 * 5/1995 Ohno ................................. 425/129.1

* cited by examiner

Primary Examiner—Tim Heitbrink
(74) Attorney, Agent, or Firm—Arter & Hadden LLP

(57) ABSTRACT

A system and method for continuous automated production of insert pieces and insert injection molded parts has insert material supply reels loaded with a flexible insert material which is fed into an insert cutter and feeder assembly. The insert material supply reels supply large quantities of insert material ready for fabrication into insert pieces for direct insertion into an injection mold. The insert cutter and feeder assembly has one or more tracks along which the insert material is guided by unit-directional rollers to a cutter which severs insert pieces from the continuous strand of insert material. The continuously produced insert pieces are inserted into injection mold cavities by various inserted/pusher mechanisms between injection molding cycles. A control system synchronizes the cutting and feeding of insert pieces with the molding cycle for continuous production of insert molded parts.

53 Claims, 7 Drawing Sheets

SYSTEM FOR CONTINUOUS MANUFACTURE OF MOLDED PARTS WITH INSERT PIECES

FIELD OF THE INVENTION

The present invention pertains generally to manufacture of parts by injection molding and, more particularly, to continuous molding of parts which have a separate insert piece which is inserted into a mold cavity prior to injecting the mold.

BACKGROUND OF THE INVENTION

Insert molding, as referred to herein, generally refers to the practice of molding a material about or around a separate piece, so that the molded material is integral with, bonded to, or partially or completely surrounds or encapsulates the separate insert piece in a finished part. To accomplish this, the insert piece must be inserted into the cavity of a mold, such as a plastic injection mold or casting mold, prior to injecting the mold with a molding material. A new insert piece must be inserted into the mold at the start of each mold cycle. Typically, the insert is positioned in the mold by hand or by robot, during the period when the mold is opened between injection/compression cycles. Of course, this additional operation per part greatly reduces the rate of mass production.

In continuous production of insert molded parts, the insert pieces must be arranged for rapid and continuous insertion into a mold. Small insert pieces may be arranged upon racks, or stacked in a magazine which feeds into the mold cavity. The insert piece supply system be constantly re-stocked and monitored throughout the production process. Typically, the insert pieces are manufactured in an operation completely separate from the molding operation, and then arranged for continuous insert molding production. This amounts to two different manufacturing operations in order to produce a single finished part.

SUMMARY OF THE INVENTION

The present invention provides an automated system for the continuous production of plastic injection molded parts which include an insert part cut from a continuous feed of insert stock material. In accordance with one general aspect of the invention, there is provided a system for automated molding of parts around insert pieces which are continuously fed, cut and inserted into a die in an injection molding machine. In accordance with a more particular aspect of the invention, there is provided a system for continuous production of insert molded parts, wherein each part has a flexible insert piece cut from a continuous strand and fed into an injection molding machine, and wherein the part is formed by injection of plastic molding material around the insert piece. The continuous cutting and feeding of the insert pieces from a supply source enables uninterrupted production of insert molded parts, eliminating many of the intermediate steps in prior production processes.

In one particular application of the invention, there is provided one or more reels for spooling up of a continuous strand of material from which insert pieces are cut for insertion into an injection mold. In a preferred embodiment, the reel has multiple spool channels for receiving multiple strands of insert material, for simultaneous feeding into multiple mold cavities. The reels are rotationally mounted and driven for continuous feed according to a rate of injection mold operation. A cutting and feeding assembly is adapted for operative association with an injection molding machine, and operates to cut insert pieces from the reel-fed supply of material, and insert the pieces into an injection mold. In one particular embodiment of the insert piece cutting and feeding assembly, the insert material is fed through roller blocks which grip the material and hold it in position for severing an insert piece by a cutting station. The severed insert piece is then advanced through the feeder assembly and inserted into a mold cavity. The mold is then closed about the insert, and molding material is injected and molded around the insert to form an insert molded part.

These and other aspects of the invention are herein described in detail with reference to the accompanying Figures.

DETAILED DESCRIPTION OF THE INVENTION

Figure 9:
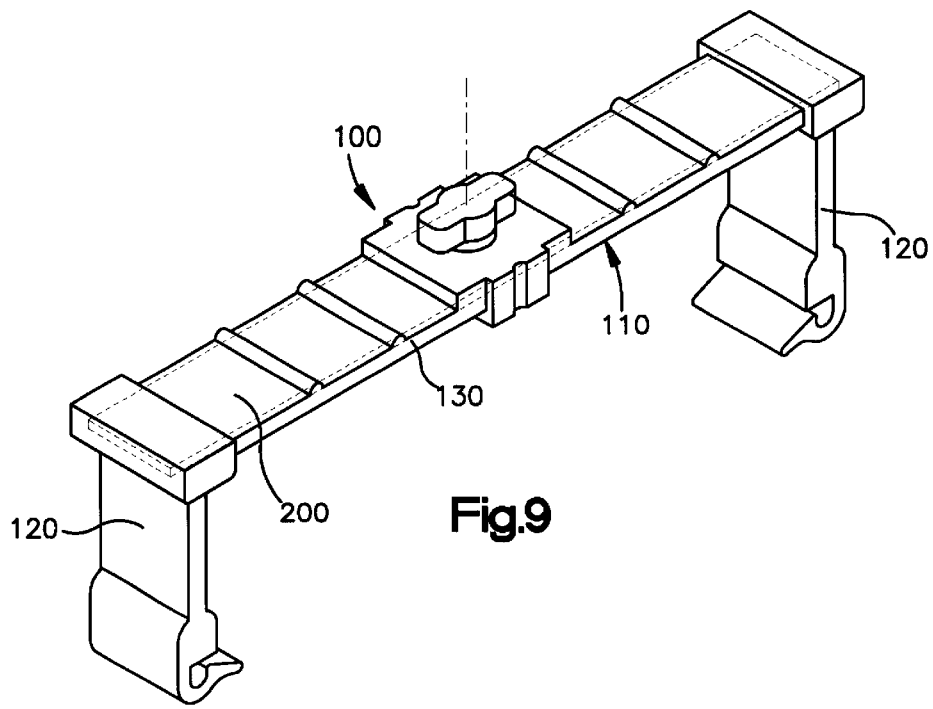
FIGS. 9, 10 and 11 are perspective, plan and elevation views, respectively, of an insert molded product which can be produced in accordance with the machinery and methods of the present invention.
Figure 10:
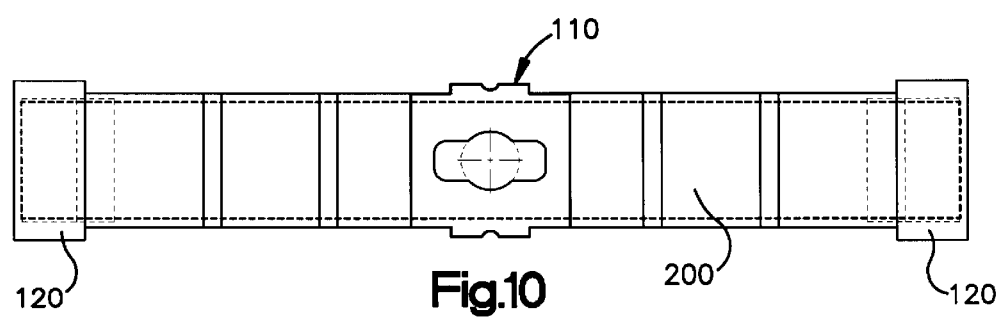
Figure 11:
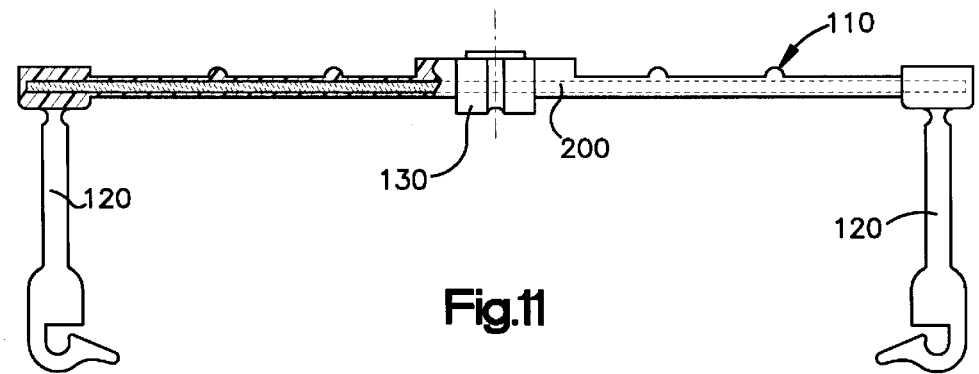

The invention provides a system and method for automated continuous production of insert molded articles, i.e., articles which are injection molded about another piece inserted into an injection mold. FIGS. 9–11 are representative of only one type of insert molded part which can be manufactured in accordance with the invention. It is described for illustrative purposes only, and does not limit the scope or applicability of the invention. As shown in FIGS. 9–11, a molded article 100 has an insert piece 200. Molded material 110 is molded around the insert piece 200, to encapsulate the insert piece and form an integral multiple component part. The molded article 100 has appendages 120 which extend from a main body 130, which surrounds the insert piece 200. The body and appendages are molded out of any material which is suitable for injection molding, such as ABS or polypropylene. The insert piece 200 is in this example generally elongate and planar, and is dimensioned to extend the approximate length of the body 130. The insert piece material may be virtually anything, but is in the described example and machinery generally flexible material which can be wound upon a reel, and which is able to be cut by shearing, chopping, sawing or other severing operations. The principles of the invention are not limited to any particular materials or forms of the molded material 110 and insert piece 200. Also, the invention is not limited to the insert material being in spooled or wound form, but rather includes the continuous feed of insert material in any configuration.

Figure 1:
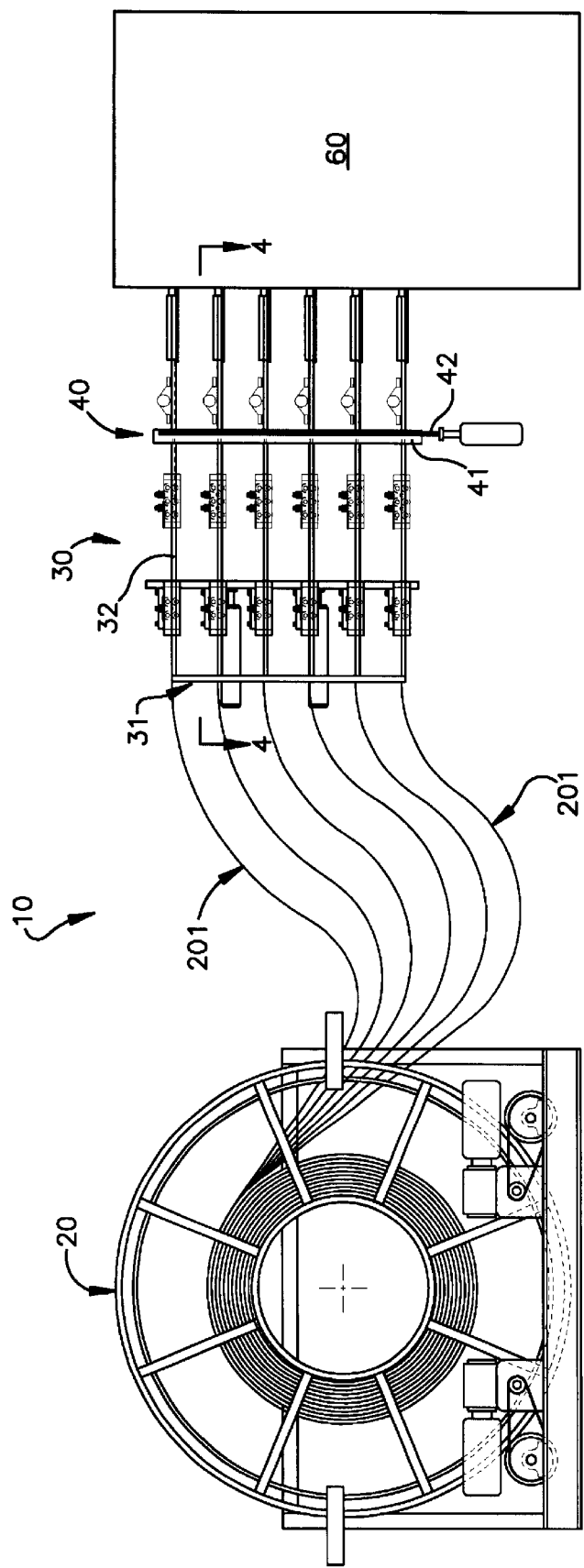
FIG. 1 is a schematic elevation of an automated system for molding of articles with insert pieces.

As shown in FIG. 1, the invention includes an automated system, indicated overall at 10, for manufacture of injection molded articles, of the type of FIGS. 9–11, which include insert pieces. The system 10 includes one or more reels 20 upon which a continuous strand of insert material 201, such as steel, glass, plastic, fibers or plastic encapsulated fibers such as pultrusions, or any other suitable material with sufficient flexibility is spooled. The insert material 201 is fed from reel 20 into an insert piece cutter/feeder assembly, indicated generally at 30, which is operatively associated with an injection molding machine, indicated generally at 60, for insertion of insert pieces, cut from the continuous strand of insert material 201, into one or more mold cavities in the injection molding machine. Each of the three main components of the system, the reel 20, cutter/feeder assembly 30 and injection molding machine 60 are further described below.

Figure 2:
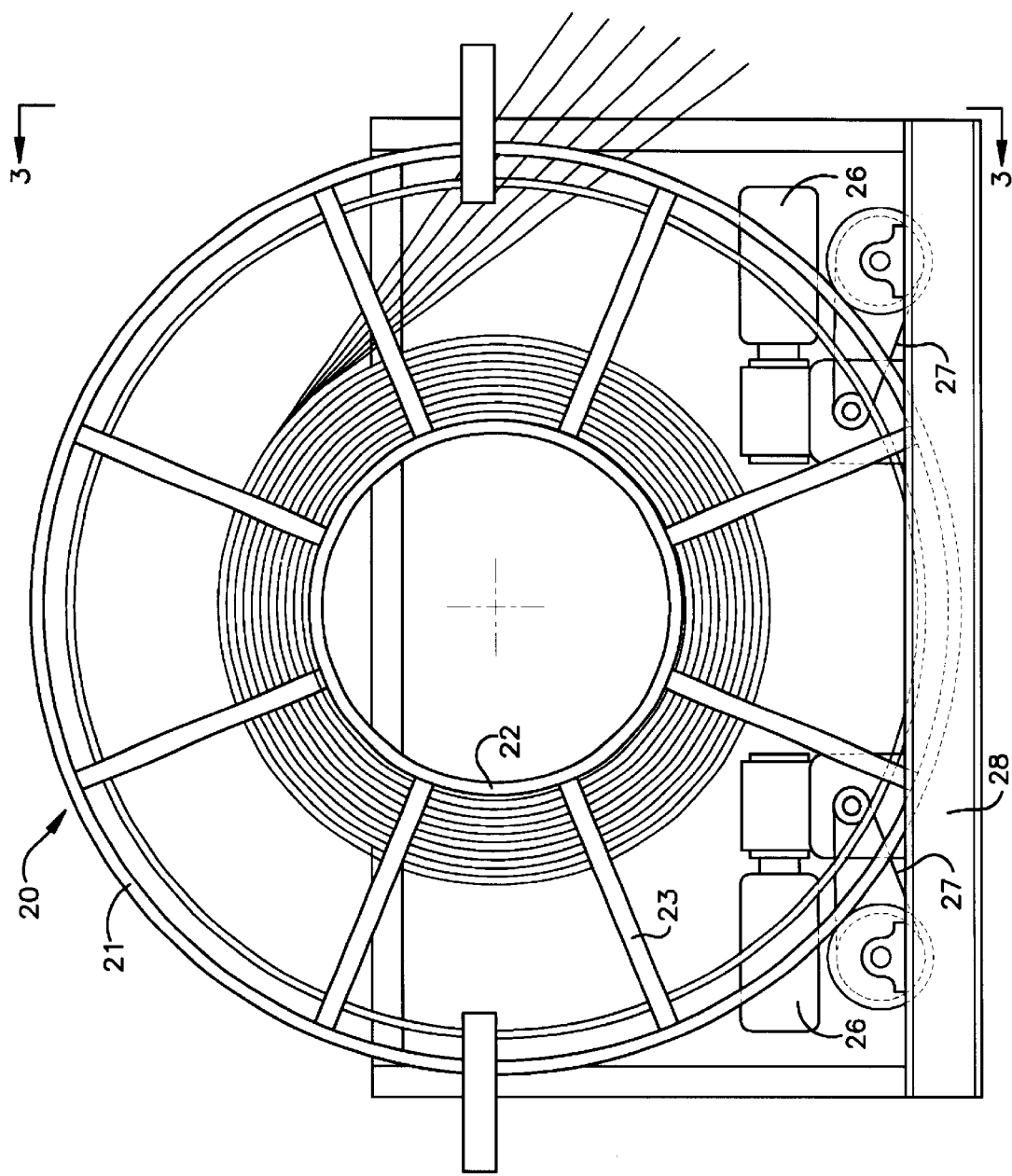
FIG. 2 is a side elevation view of an insert material reel of the present invention.
Figure 3:
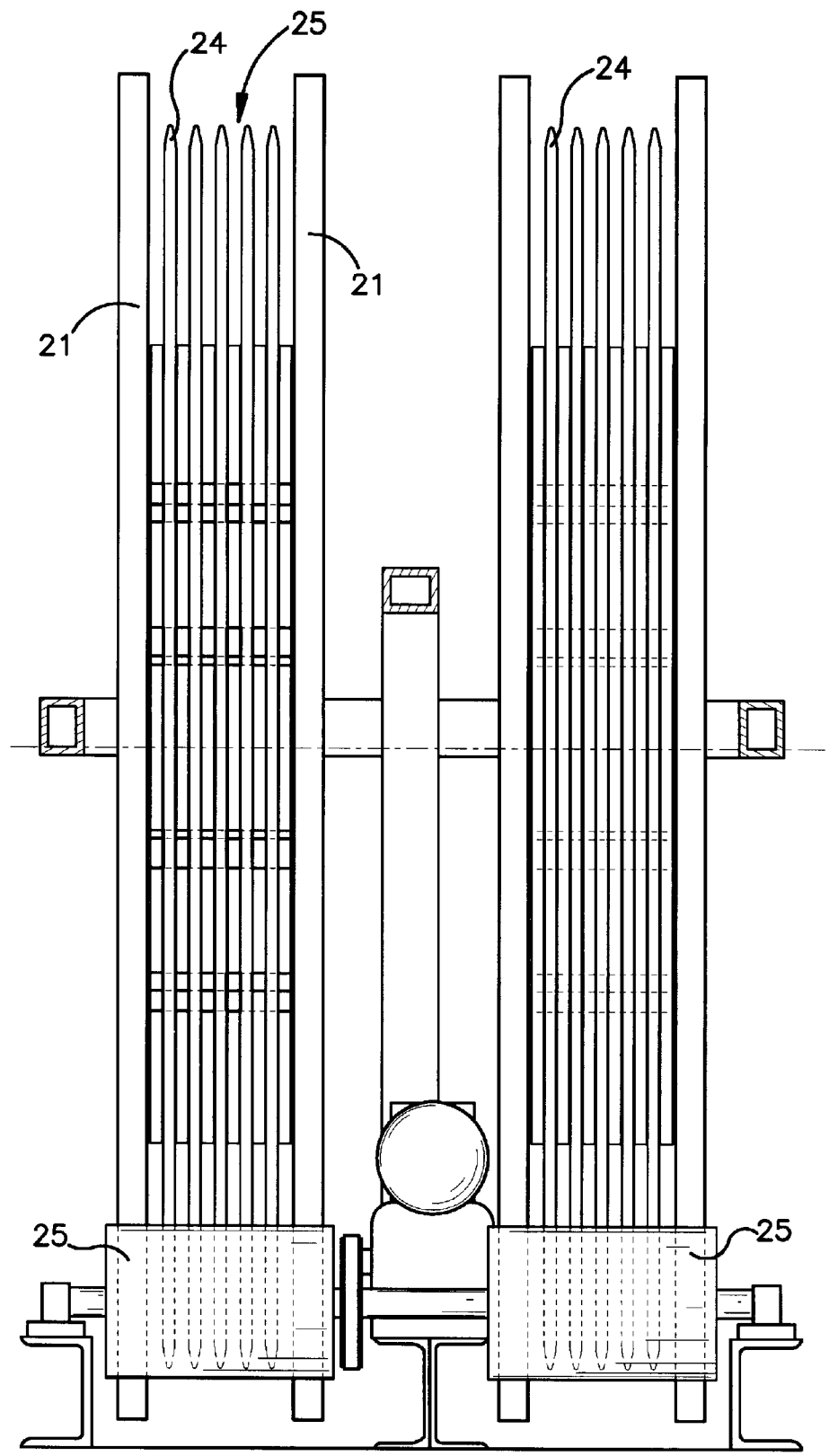
FIG. 3 is an end elevation view of two insert material reels mounted in tandem.

As separately depicted in FIG. 2 and FIG. 3, the reel 20 is formed by major rings 21 arranged in parallel planes about a hub 22. Spoke members 23 extend from hub 22 to rings 21. As shown in FIG. 3, between rings 21 are a plurality of spacer rings 24 arranged in spaced apart parallel planes about hub 22, and also supported by spoke members which extend from the hub. In the embodiment shown, five spacer rings 24 form six separate reel channels 25, between the major rings 21 for spooling of six different feeds or continuous strands of insert material, flexible enough to be wound about hub 22. The reel 20 can be dimensioned according to the type and amount of insert material to be spooled. In one embodiment, for example, the approximate diameter of the major rings 21 may be as large as seven to eight feet, and the diameter of the hub 22 approximately two to three feet. Of course, the reel 20 can be made larger or smaller. Different numbers of spacer rings can be used, or no spacer rings at all.

As further shown in FIG. 2 and FIG. 3, the major rings 21 of the reel 20 are mounted upon rollers 29, one or more of which are rotationally driven by motors 26 and belts 27, in order to spool material on to the reel in preparation for production, and to spool material off of the reel at a rate which corresponds to the rate of injection molding, as further described below. The rollers 29 and motors 26 are mounted upon a support frame 28, which can be positioned proximate to an injection molding machine as further described. The low profile of the frame 28 as shown is advantageous for loading and unloading of the reels. By mounting two reels in tandem, as shown in FIG. 3, production does not have to be interrupted during a reel change.

Figure 4:
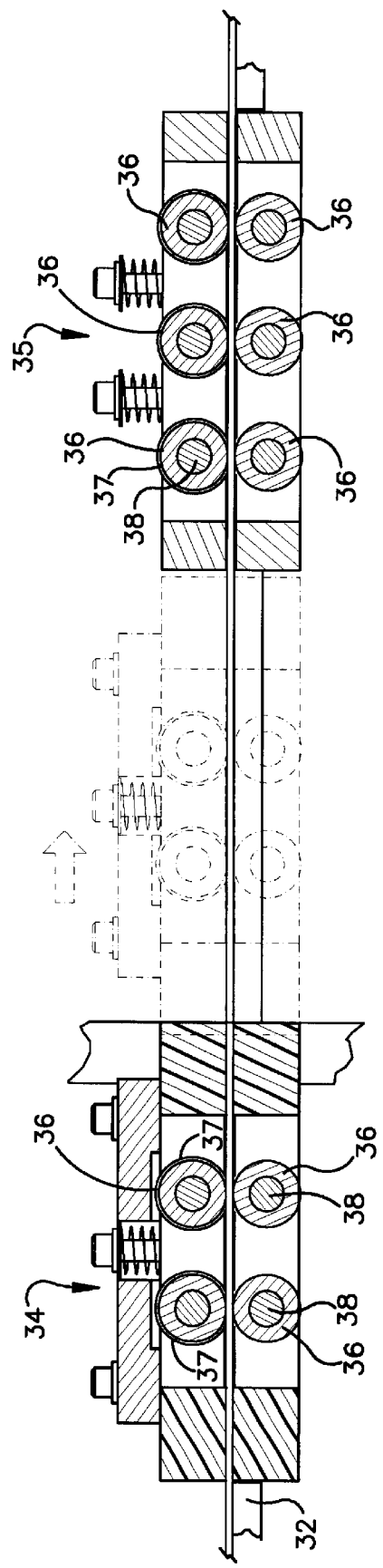
FIG. 4 is an elevation view of a portion of an insert piece cutting and feeding assembly of the present invention, taken in the direction of the arrows 4—4 in FIG. 1.

The continuous strands of insert material 201 are fed from the reels 20 into an insert piece cutter/feeder assembly, indicated generally at 30 in FIG. 1, and further illustrated in FIGS. 4–8. The insert piece cutter/feeder assembly 30 includes a frame 31 which can be separately supported or attached directly to a molding machine 60, or to a mold within the molding machine. The frame 31 supports one or more tracks 32 along which strands of the insert material 201 are guided toward the injection molding machine 60. As further shown in FIG. 4 and FIG. 5, on each track 32 is mounted a first roller block 34, and a second roller block 35. The roller blocks each include one or more sets of vertically opposed upper and lower rollers 36. The upper or lower rollers are mounted in spring bias against the opposing rollers to exert a variable compression force against material positioned between the rollers. As shown in FIG. 4, the top rollers 36 may be configured with flanges 37 which bear against the opposing lower rollers, and whereby rotation of the top rollers drives opposite rotation of the lower rollers. The flanges 37 also function to keep the insert material in alignment with the contact surfaces of the rollers.

Figure 5:
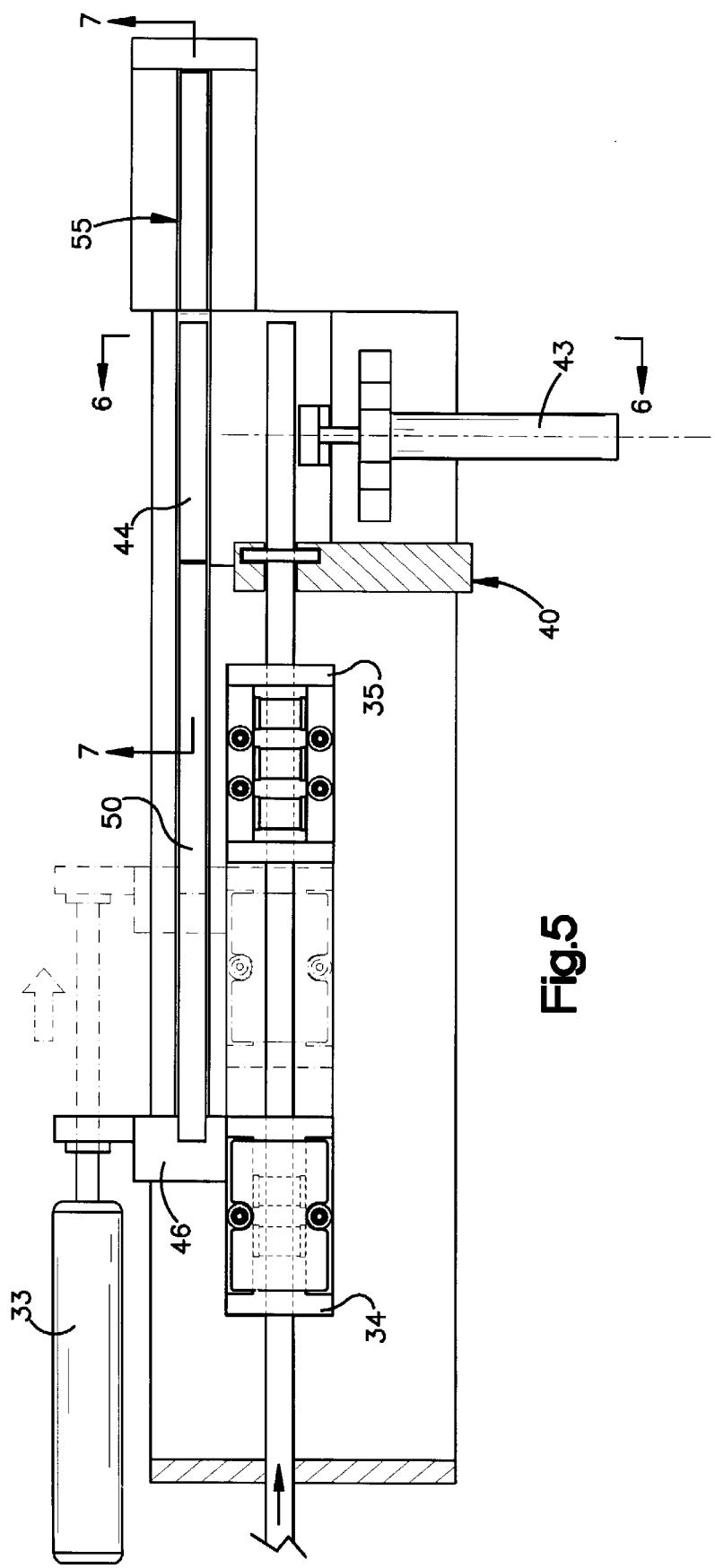
FIG. 5 is a top view of a portion of an insert piece cutting and feeding assembly of the present invention.

The roller axes 38 are ratchet mounted for rotation in only one direction, to allow the insert material to pass through the first roller block 34, and to prevent withdrawal of the insert material from the second roller block 35. As shown in FIG. 5, the first roller block 34 is actuated, by linear actuator 33, to reciprocate along track 32, toward and away from roller block 35. As roller block 34 travels to the left over the insert material, the upper rollers 36 rotate counterclockwise while the opposing lower rollers rotate clockwise. This counter, unidirectional rotation is induced by frictional contact of the insert material traveling between the upper and lower rollers. When the first roller block 34 then reciprocates to travel to the right (in FIG. 4), the upper and lower rollers 36 lock up, binding the insert material between them and advancing the insert material along the track 32 toward and into the second roller block 35. In the second roller block 35 the rollers similarly rotate unidirectionally, with the upper rollers rotating counterclockwise and the lower rollers rotating clockwise. The frictional gripping force of the upper and lower rollers of the second roller block prevent the insert material from retracting from the second roller block 35 (to the left in FIG. 4) when the first roller block 34 reciprocates back to the left.

Figure 6:
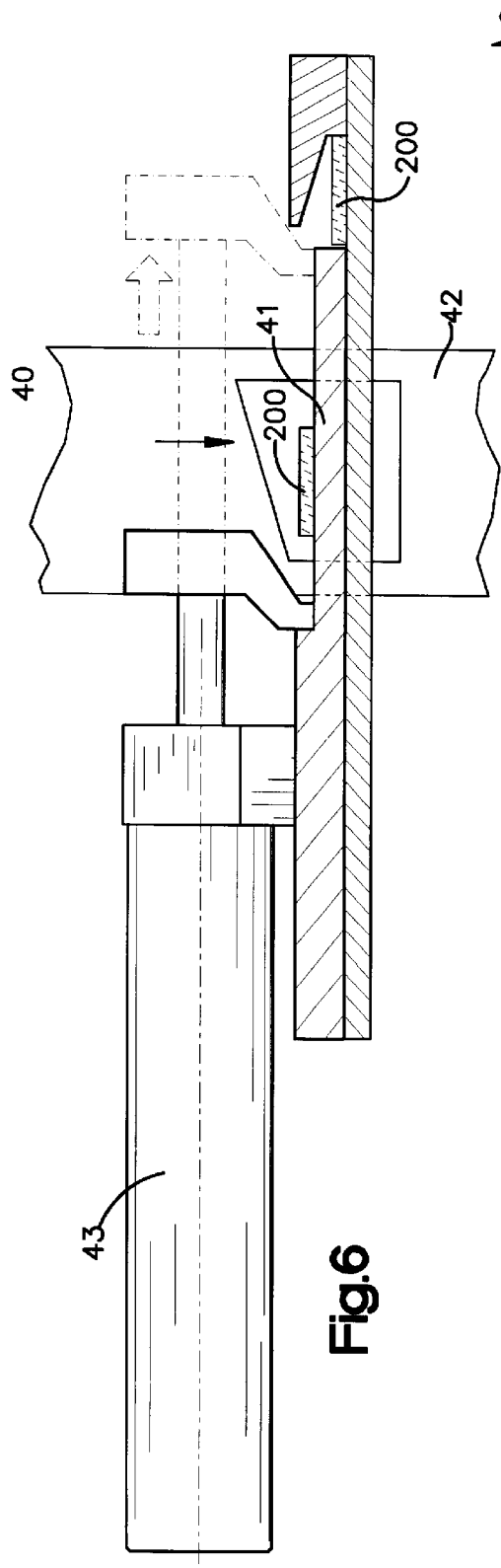
FIG. 6 is partial cross-sectional view of a portion of an insert piece cutting and feeding assembly, taken in the direction of the arrows 6—6 in FIG. 5.

Once the insert material has passed through the first and second roller blocks 34 and 35, it then passes through a cutting station, indicated generally at 40 in FIGS. 1, 5 and 6. The cutting station 40 includes a fixed cutting edge 41 mounted on the track 32, and a moving cutting blade 42 which travels vertically to shear the material against the fixed cutting edge 41, shearing off or otherwise forming an insert piece 200 from the strand of insert material to a desired length for insertion into the cavity of an injection mold.

Figure 7:
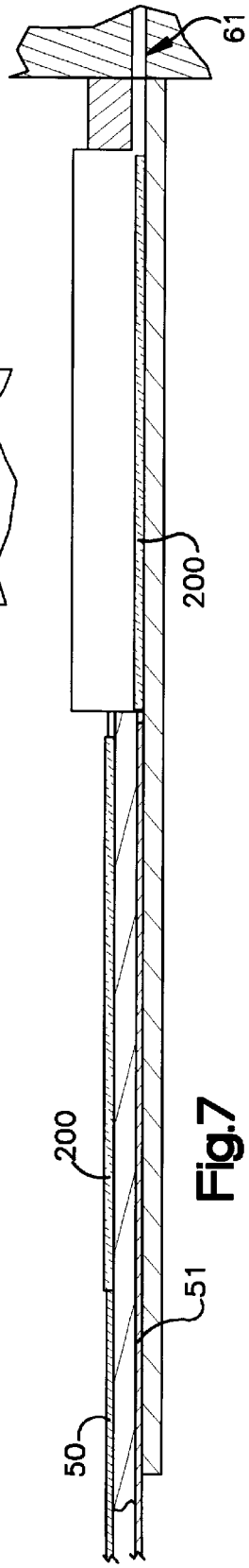
FIG. 7 is a partial cross-sectional view of a portion of an insert piece cutting and feeding assembly, taken in the direction of the arrows 7—7 in FIG. 5.
Figure 8:
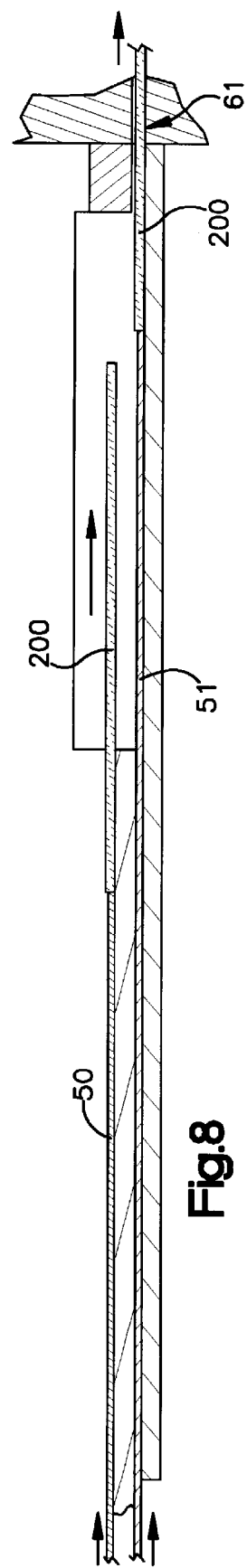
FIG. 8 is a partial cross-sectional view of a portion of an insert piece cutting and feeding assembly of the present invention.

As shown in FIG. 5, once the insert piece 200 is sheared off from the strand of insert material, it is translated laterally by an actuator 43 (also referred to as a "shuttler") into a trough 44 within track 32. In the particular embodiment shown, linear actuator 33 is connected to the first roller block 34, through a pusher block 46. As shown in FIGS. 7 and 8, upper and lower insert piece pushers 50 and 51 extend from block 46 toward trough 44. When actuator 33 advances the first roller block 34 and pusher block 46 toward the second roller block 35 (to the phantom position shown in FIG.4), the upper pusher 50 advances the insert piece 200 from trough 44 into a transfer station 55. When the pusher block 46 is advanced again (toward the second roller block 35 (to the phantom position shown in FIG. 4), the lower insert piece pusher 51 linearly advances the insert piece from the transfer station 55 into a mold cavity 61 of an injection mold. The pushers are then retracted for the next cycle, whereupon the mold is closed about the insert piece, and molding material is injected about the insert piece to form an insert molded part.

The described system thus provides continuous production of insert molded parts, with a large continuous supply of insert material which does not have to be pre-manufactured or divided into individual parts. The system is applicable to any type of mold wherein a suitable entry port into the mold cavity can be made. In the described example, the inserts 200 slide into the mold cavity through a side entry configured to the cross-section of the insert. Separate reel and cutter/feeder assemblies can be arranged on opposing sides of a multiple cavity mold, so that inserts are simultaneously fed into both sides of the mold. Alternatively, the inserts can be simply positioned between the mold halves when the mold is open and otherwise held in place until the mold is closed.

The invention also includes a control system for controlling operation of the insert piece material stock supply, and the insert piece cutting and feeding assembly in synchronization with the operation of an injection molding machine. For example, a machine control system, such as a statistical process controller (such as manufactured by the Allen-Bradley Company) or as supplied with an injection molding machine, is connected to the drive mechanism of the insert piece material stock reel(s) and to the insert piece cutting and feeding assembly. In general, the control system is programmed to supply insert pieces to the mold according t the molding cycle. For example, if the mold opens every fifteen seconds and a newly molded part is removed or ejected, another insert piece is supplied to the mold shortly thereafter, whereupon the mold closed to form the next part. While the mold is closed, the insert piece for the next part is cut and prepared or positioned for insertion into the mold. The rate of advancement of the insert material supply reel(s) is set and controlled according to the mold cycle, and the corresponding rate of operation of the insert cutting and feeding assembly. The invention is thus adaptable to any type and speed molding operation. In many applications, the controller for that injection molding machine can be modified or programmed to control the synchronous operation of the insert piece cutting and feeding assembly.

Although the invention has been described with reference to certain preferred and alternate embodiments, the concepts and principles of the invention are not limited to these specific arrangements. For example, other types of insert material, in forms other than spooled reels, may be used. Also, the insert piece cutting and feeding assembly may be used in connection with any type of molding, forming, stamping, cutting or fastening machine, and with different types of molds or jigs or dies, including multiple cavity molds with multiple mold plates.

What is claimed as the invention is:

1. A system for automated production of insert molded parts having an insert piece and material molded about the insert piece by injection molding, the system comprising:
    an insert material supply structure for supplying insert material in a substantially continuous form;
    an insert material cutter and feeder assembly operative to receive insert material from the supply, to cut an insert piece from the supply for insertion into an injection mold cavity; and
    an insert piece insertion device operative to position an insert piece in an injection mold cavity;
        wherein the insert material supply structure is in the general form of a reel having a hub, and the insert material is wound about the hub of the reel; and
        wherein the reel is supported by one or more rollers, and wherein rotation of the roller induces rotation of the reel.

2. The system of claim 1 wherein the reel has multiple channels configured to hold multiple spools of insert material.

3. The system of claim 1 in combination with an insert material made of a plastic.

4. The system of claim 1 wherein the reel has a diameter in an approximate range of four to eight feet.

5. The system of claim 1 wherein the insert material cutter and feeder assembly has a track on which the insert material travels, a first roller block through which the insert material travels, a second roller block through which the insert material travels, an insert material cutter by which an insert piece is cut from the insert material, and a pusher for pushing an insert piece from the track into an injection mold cavity.

6. The system of claim 5 wherein the insert material cutter and feeder assembly further includes an actuator for laterally translating an insert piece cut at the cutting station from the insert material.

7. The system of claim 5 wherein the insert material cutter and feeder assembly further includes an insert material feeder actuator connected to the first roller block and operative to reciprocate the first roller block upon the track.

8. The system of claim 7 wherein the insert material feeder actuator is connected to the pusher.

9. The system of claim 6 further comprising a trough in the track into which an insert piece is laterally translated by the actuator.

10. The system of claim 5 comprising an upper pusher and a lower pusher, and a transfer station, the upper pusher operative to push an insert piece into the transfer station, and the lower pusher operative to push the insert piece into an injection mold cavity.

11. The system of claim 5 wherein the insert material feeder and cutter assembly comprises a plurality of tracks, each track having first and second roller blocks, a cutting station, and a pusher device for pushing an insert piece into an injection mold cavity.

12. The system of claim 5 in combination with an injection mold, wherein the track is generally aligned with an opening in the injection mold for insertion of an insert piece.

13. The system of claim 1 wherein the insert material cutter and feeder assembly is attached directly to an injection mold.

14. The system of claim 13 in combination with an injection molding machine.

15. The system of claim 5 wherein the insert material cutter has a stationary blade and a movable blade, and which is positioned relative to the track so that the insert material passes between the stationary blade and the movable blade, whereby an insert piece is cut from the insert material by motion of the movable blade.

16. The system of claim 1 wherein the insert material supply structure and the insert cutter and feeder assembly are controlled in synchronization with an injection molding machine.

17. The system of claim 5 wherein the first roller block includes at least one pair of upper and lower rollers operative to grip the insert material, the rollers being mounted for unidirectional rotation which resists withdrawal of the insert material from the first roller block in a direction opposite to a direction of insertion of the insert material into the first roller block.

18. The system of claim 5 wherein the second roller block includes at least one pair of upper and lower rollers operative to grip the insert material, the rollers being mounted for unidirectional rotation which resists withdrawal of the insert material from the second roller block in a direction opposite to a direction of insertion of the insert material into the second roller block.

19. An insert cutter and feeder assembly for continuous production of insert pieces and automated insertion of insert pieces into an injection mold, the insert cutter and feeder assembly comprising:

a track for receiving an insert material, the track supported in proximity to an injection mold into which an insert piece is to be inserted;

a first roller block on the track, the first roller block having a pair of upper and lower rollers configured to bear against the insert material is the insert material passes through the first roller block, the first roller block connected to a linear actuator operative to reciprocate the first roller block along the track, a second roller block on the track, the second roller block having a pair of upper and lower rollers configured to bear against the insert material is the insert material passes through the second roller block, an insert material cutter having a stationary cutting edge on the track and a movable cutting blade operative to move relative to the stationary cutting edge with insert material between the stationary cutting edge and the movable cutting blade, an insert piece shuttler operative to laterally shuttle an insert piece cut from the insert material on the track, and an insert piece feeder operative to feed an insert piece from the track into a cavity of an injection mold.

20. The insert cutter and feeder assembly of claim 19 wherein the insert piece feeder is a generally linear member operatively connected to the linear actuator.

21. The insert cutter and feeder assembly of claim 19 further comprising a trough into which the insert piece is translated by the insert piece shuttler.

22. The insert cutter and feeder assembly of claim 21 further comprising a transfer station, an upper insert piece pusher and a lower insert piece pusher, the upper insert piece pusher operative to push an insert piece from the trough into the transfer station, and the lower insert piece pusher operative to push the insert piece from the trough into an injection mold.

23. The insert cutter and feeder assembly of claim 19 wherein the rollers of the first roller block are journalled to rotate in a single direction.

24. The insert cutter and feeder assembly of claim 19 wherein the rollers of the second roller block are journalled to rotate in a single direction.

25. The insert cutter and feeder assembly of claim 19 wherein controlled operation of the linear actuator and the insert piece shuttler is in synchronization with the opening and closing of an injection mold into which the insert pieces are inserted.

26. A system for automated production of insert molded parts which have an insert piece and molded material in contact with the insert piece, the molded material formed by an injection molding process in a mold and at least a portion of the insert piece in the mold during the injection molding process, the system comprising:

a substantially continuous supply of insert piece material;

an insert piece cutting and feeding assembly configured for synchronous operation with an injection molding machine and a mold in the injection molding machine, the insert piece cutting and feeding assembly having an inlet adapted to receive a substantially continuous supply of insert piece material stock, a feed mechanism for feeding the insert piece material stock to an insert piece cutting station which cuts an insert piece from the insert piece material stock, and a feed mechanism which feeds an insert piece into the mold in the injection molding machine prior to molding material being introduced into the mold by the injection molding machine; and a control system for controlling operation of the insert piece cutting and feeding assembly in synchronization with operation of the injection molding machine, wherein the insert piece cutting and feeding assembly is attached to the injection molding machine, wherein the mold in the injection molding machine has an opening to a mold cavity of the mold, the opening corresponding in size to cross-sectional dimensions of an insert piece, and wherein the insert piece cutting and feeding assembly is operative to cut two insert pieces prior to insertion of one of the two insert pieces into the mold.

27. A system for automated production of insert molded parts having an insert piece and material molded about the insert piece by injection molding, the system comprising:

an insert material supply structure for supplying insert material in a substantially continuous form;

an insert piece cutting and feeding assembly, comprising:

an insert material feeder operative to supply insert material to an insert material cutter;

an insert material cutter operative to cut an insert piece from a supply of insert material; and an insert piece pusher operative to advance a precut insert piece into an injection mold cavity.

28. The system of claim 27 wherein the insert material supply structure is in the general form of a reel having a hub, and the insert material is wound about the hub of the reel.

29. The system of claim 27 wherein the reel is supported by one or more rollers, and wherein rotation of the roller induces rotation of the reel.

30. The system of claim 27 wherein the reel has multiple channels configured to hold multiple spools of insert material.

31. The system of claim 27 in combination with an insert material made of a plastic.

32. The system of claim 27 wherein the reel has a diameter in an approximate range of four to eight feet.

33. The system of claim 27 wherein the insert material supply structure and the insert cutter and feeder assembly are controlled in synchronization with an injection molding machine.

34. The system of claim 33 in combination with an injection molding machine.

35. The system of claim 27 wherein the insert material cutter and feeder assembly has a track on which the insert material travels, a first roller block through which the insert material travels, a second roller block through which the insert material travels, an insert material cutter by which an insert piece is cut from the insert material, and a pusher for pushing an insert piece from the track into an injection mold cavity.

36. The system of claim 35 comprising an upper pusher and a lower pusher, and a transfer station, the upper pusher operative to push an insert piece into the transfer station, and the lower pusher operative to push the insert piece into an injection mold cavity.

37. The system of claim 35 wherein the insert material feeder and cutter assembly comprises a plurality of tracks, each track having first and second roller blocks, a cutting station, and a pusher device for pushing an insert piece into an injection mold cavity.

38. The system of claim 35 in combination with an injection mold, wherein the track is generally aligned with an opening in the injection mold for insertion of an insert piece.

39. The system of claim 35 comprising an upper pusher and a lower pusher, and a transfer station, the upper pusher operative to push an insert piece into the transfer station, and the lower pusher operative to push the insert piece into an injection mold cavity.

40. The system of claim 35 wherein the insert material feeder and cutter assembly comprises a plurality of tracks, each track having first and second roller blocks, a cutting station, and a pusher device for pushing an insert piece into an injection mold cavity.

41. The system of claim 35 in combination with an injection mold, wherein the track is generally aligned with an opening in the injection mold for insertion of an insert piece.

42. The system of claim 35 wherein the insert material cutter has a stationary blade and a movable blade, and which is positioned relative to the track so that the insert material passes between the stationary blade and the movable blade, whereby an insert piece is cut from the insert material by motion of the movable blade.

43. The system of claim 35 wherein the first roller block includes at least one pair of upper and lower rollers operative to grip the insert material, the rollers being mounted for unidirectional rotation which resists withdrawal of the insert material from the first roller block in a direction opposite to a direction of insertion of the insert material into the first roller block.

44. The system of claim 35 wherein the second roller block includes at least one pair of upper and lower rollers operative to grip the insert material, the rollers being mounted for unidirectional rotation which resists withdrawal of the insert material from the second roller block in a direction opposite to a direction of insertion of the insert material into the second roller block.

45. The system of claim 35 wherein the insert material cutter and feeder assembly further includes an insert material feeder actuator connected to the first roller block and operative to reciprocate the first roller block upon the track.

46. The system of claim 45 further comprising a trough in the track into which an insert piece is laterally translated by the actuator.

47. The system of claim 35 wherein the insert material cutter and feeder assembly further includes an actuator for laterally translating an insert piece cut at the cutting station from the insert material.

48. The system of claim 46 wherein the insert material feeder actuator is connected to the pusher.

49. A system for automated production of insert molded parts which have an insert piece and molded material in contact with the insert piece, the molded material formed by an injection molding process in a mold and at least a portion of the insert piece in the mold during the injection molding process, the system comprising:

a substantially continuous supply of insert piece material;

an injection molding machine having an injection mold, the injection mold having an injection mold cavity; and an insert piece cutting and feeding assembly configured for synchronous operation with the injection molding machine and injection mold cavity, the insert piece cutting and feeding assembly comprising:

an insert material feeder operative to supply insert material to an insert material cutter;

an insert material cutter operative to cut an insert piece from a supply of insert material; and an insert piece pusher operative to advance a precut insert piece into an injection mold cavity.

50. The system of claim 49 wherein the insert piece cutting and feeding assembly is attached to the injection molding machine.

51. The system of claim 49 further comprising a control system for controlling operation of the insert piece cutting and feeding assembly in synchronization with operation of the injection molding machine.

52. The system of claim 49 wherein the injection mold has an opening to the injection mold cavity, the opening corresponding in size to cross-sectional dimensions of an insert piece.

53. The system of claim 49 wherein the insert piece cutting and feeding assembly is operative to cut two insert pieces prior to insertion of one of the two insert pieces into the mold.

* * * * *